Nov. 22, 1966 S. W. WOLFE 3,287,683
FULLY CONTINUOUSLY ROTATABLE POTENTIOMETER
Filed Aug. 31, 1964
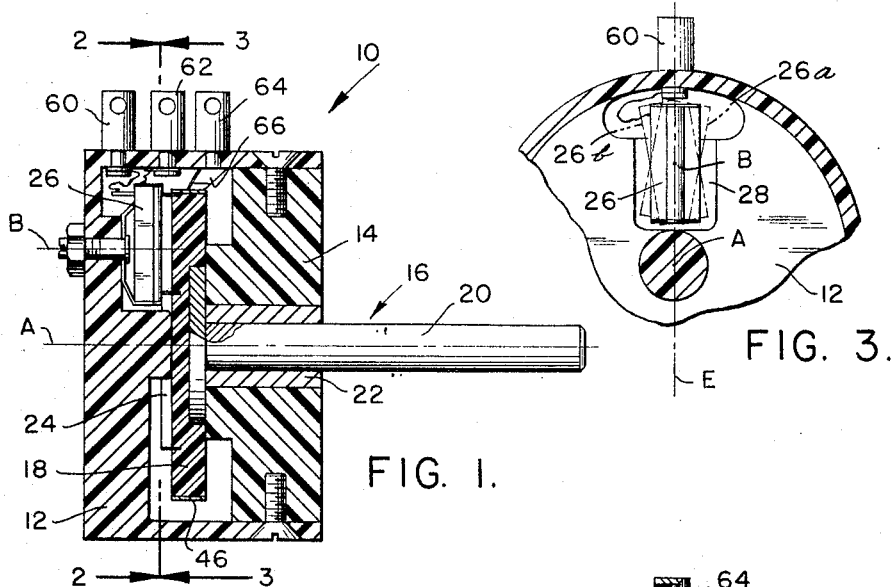
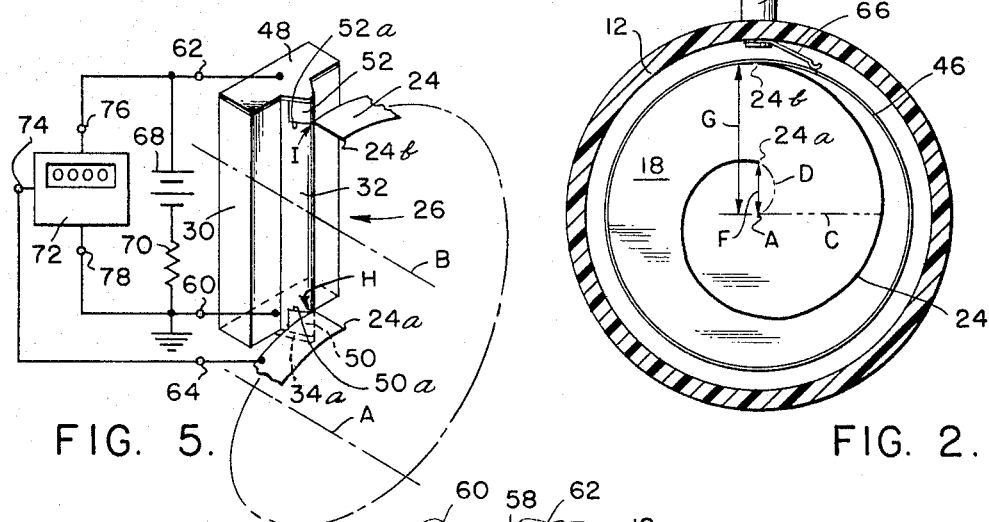
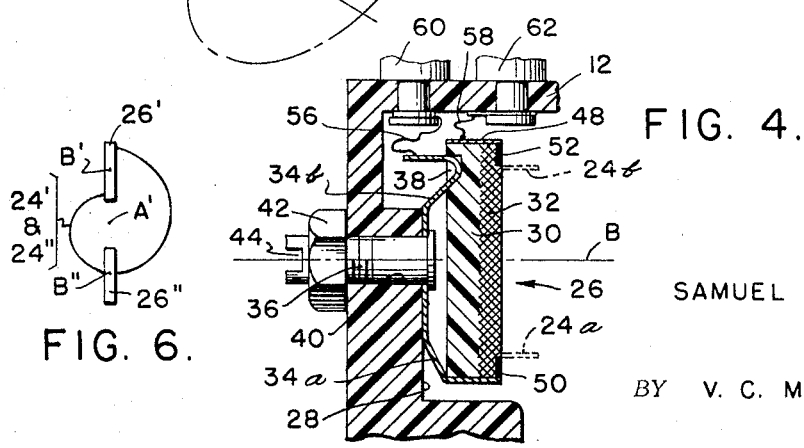
SAMUEL W. WOLFE
*INVENTOR.*
BY V. C. MULLER
ATTORNEY.

United States Patent Office 3,287,683
Patented Nov. 22, 1966

3,287,683
FULLY CONTINUOUSLY ROTATABLE POTENTIOMETER
Samuel W. Wolfe, Pasadena, Calif., assignor to the United States of America as represented by the Secretary of the Navy
Filed Aug. 31, 1964, Ser. No. 393,456
9 Claims. (Cl. 338—165)

The invention described herein may be manufactured and used by or for the Government of the United States of America for governmental purposes without the payment of any royalties thereon or therefor.

This invention relates to potentiometers, and more particularly to precision potentiometers of the type in which the potentiometer shaft may be fully continuously rotated through angles in excess of 360°.

In a potentiometer of the type referred to, at some portion of its 360° of possible shaft displacement there takes place a discrete cross over between an angular position in which the potentiometer is in its zero resistance output condition and an angular shaft position in which the potentiometer is in its maximum resistance output condition. Defining this cross-over position with accuracy and with a degree of angular resolution consistent with that of the linear portion of the potentiometer's operating range has been a serious problem prior to the present invention. A known prior art approach is to construct the fixed resistance element of extremely fine resistance wire wound around a circular core. The cross-over position in this construction consists of the adjacent disposition of the first and last loops of the winding, and cross-over is effected by movement of a sliding contact across these adjacent elements. However, even with the finest available wire the cross-over point is characterized by ambiguity because of the inherent difficulties of providing positive control of the point of contact where a sliding contactor sweeps across fine wires.

Solution of this problem has been made more difficult because certain applications of a potentiometer require that the potentiometer shaft have a zero reference position in which the potentiometer is in an "absolute zero" output condition. An example of this is where a potentiometer is used in conjunction with a digital numeral indicator which displays four significant decimal digits, and the reference position of the potentiometer should cause a zero indication on such a display.

Also, where fine wire windings are employed, the resulting potentiometer construction is necessarily limited in service life under continuous wiping action, the sliding contactor eventually wearing out the fine wire.

The possibility of obtaining a fully continuously rotatable potentiometer which is durable and has a uniform high degree of accuracy and resolution throughout 360° of shaft rotation is of great importance to the electronic and electro-mechanical industries. Recent developments in servomechanisms and digital circuitry have provided inexpensive and convenient circuits which process signals representing an angular shaft position with a high degree of accuracy. Lacking a potentiometer construction having the desired accuracy and uniformity of resolution it has, prior to the present invention, been necessary to employ digital code wheel devices. These devices have a wheel surface containing permanent discrete areas of conductivity and non-conductivity, and employ an arrangement of precision brushes which wipe across these areas to provide a digitally coded signal representing the shaft position. As is well known, the cost of manufacture of these code wheels, and the associated brush arrangements and code circuitry is prohibitive in many applications.

Accordingly the objectives of the present invention include provision of:

(1) An improved precision potentiometer of the type in which the potentiometer shaft may be fully continuously rotated through angles in excess of 360° and having a high degree of accuracy and angular resolution throughout its full 360° range of possible shaft displacements, including the portion of this range at which cross over between zero and maximum resistance potentiometer output conditions occurs.

(2) An improved precision potentiometer in accordance with the preceding objective, which has an accurately defined zero reference shaft position in which the potentiometer positively provides an "absolute zero" potentiometer output condition.

(3) An improved precision potentiometer of the type in which the potentiometer shaft may be fully continuously rotated through angles in excess of 360° which is rugged in construction and durable under operating conditions in which the shaft is continuously in motion over long periods of time.

(4) A low cost device for accurate conversion of a shaft position into an electrical signal.

Other objects and many of the attendant advantages of this invention will be readily appreciated as the same becomes better understood by reference to the following detailed description when considered in connection with the accompanying drawings wherein:

FIG. 1 is a central section of one form of potentiometer in accordance with the present invention, FIG. 2 is a section taken substantially along lines 2—2 of FIG. 1;

FIG. 3 is a fragmentary section taken along line 3—3, FIG. 1;

FIG. 4 is an enlarged detail of FIG. 1;

FIG. 5 is a diagrammatic and isometric view of certain parts of FIG. 1, and including a schematic of an associated electrical circuit, and FIG. 6 is a diagrammatic ilustration of a modification of the invention.

Referring now to the drawing, and in particular to FIG. 1, a potentiometer 10 is of the fully continuous rotation type, and comprises a hollow cup-shaped cylindrical housing member 12 having a central axis A. Member 12 forms the rear wall and outer casing of the potentiometer. The open front end of the housing member is closed by an insert member 14 removably secured in place by screws. The rotatable pick off element 16 of the potentiometer comprises a disk portion 18 integrally joined to a boss formed on one end of a shaft 20. Disk portion 18 is disposed in a cylindrical space between housing and insert members 12 and 14. Shaft 20 is rotatably supported by a co-axial bearing 22 carried by the insert member. The free end of the shaft projects from the front face of the potentiometer, forming the movable member of the potentiometer for controlling the pick off position. The portion of pick off element 16 providing the electrical contact is a metallic ribbon 24, FIGS. 1 and 2, shaped as a segment of a spiral, and which is carried by the rear face of disk portion 18 with the ribbon projecting edgewise from the surface of the disk. The resistance element of the potentiometer is in the form of a slab 26, FIGS. 1 and 3, of plastic material disposed in a rectangular recess 28 formed in the inner surface of the rear wall. As is best shown in FIGS. 4 and 5, slab 26 comprises a main body portion 30 of a normally di-electric plastic of a non-hygroscopic type, such as diallylphthalate, and a straight, elongated, ridgelike resistance strip 32 of a different formulation of such plastic material which exhibits predetermined resistance characteristics. Resistance strip 32 has a predetermined resistivity per unit volume and also has a predetermined uniform ohmic cross-section so that the resistance between any two points along its length varies in direct proportion to the distance separating the points.

Formulation of such resistance strips involves a "doping" type of operation, and is conventional in the field of plastic materials technology commonly known as "conductive plastics." For example, slab units of this type may be commercially obtained from Markite Corporation, New York, N.Y.; Beckman Instruments Incorporated, Fullerton, California; New England Instruments Company, Waltham, Mass., and Fairchild Control, a division of Fairchild Camera, Hicksville, Lonf Island, N.Y. Slab 26 is supported by a resilient conductor strip 34, FIG. 4, having opposed wing portions 34a and 34b, which strip is affixed at its center to a stud 36. Wing portion 34a is bonded to the inner end of slab 26. Wing portion 34b is bent to form a bight which is disposed in a small rectangular cutout 38, FIG. 4, formed in the rear face of the slab, with the bight in abutting engagement with the bottom of the cutout. Stud 36 extends through a hole 40 formed in the rear wall of housing member 12 and aligned along an axis B. A threaded end portion of the stud projects from the rear side of the potentiometer housing where a lock nut 42 threadedly engages the end portion. Nut 42 locks the stud, and in turn the slab 26, against angular rotation about axis B. Stud 36 is provided with slot 44 in its projecting end for engagement with a suitable tool for adjustment of the angular position of slab 26 about axis B, prior to locking by nut 42. The feature of adjustability of angular position of the slab 26 is illustrated in FIG. 3 by phantom outlinne positions 26a and 26b, it being understood that the magnitudes of deflection shown are greatly exaggerated in comparison to actual deflections in an assembled potentiometer. The resiliency of conductor strip 34 urges resistance strip 32 into engagement with the projecting edge of metallic ribbon 24.

The disk portion 18 of rotatable pick off element 16 is constructed of an insulating plastic, which is integrally molded onto the boss at the end of shaft 20. The spiral shape of ribbon 24, FIG. 2, is that of a segment of a reference Archimedean spiral curve generated about axis A, with the segment exactly 360° in angular length. Starting at a reference angular position C, the reference Archimedean spiral curve D, is generated in a counterclockwise direction. The innermost end 24a of the ribbon is disposed 90° angular degrees along the curve and the outermost end 24b disposed 450° along the curve, providing the desired 360° segment. The spiral metallic ribbon is preferably made by first precision milling a slot, which accurately follows the reference spiral curve, in the face of the plastic disk portion, and then mounting flexible metallic ribbon in the slot with a force fit, so that the ribbon assumes the shape of the spiral. In one exemplary embodiment of the invention, ribbon 24 is made of a platinum or nickel alloy having a thickness of 0.010", and a width of $\frac{1}{16}$", and is mounted in a $\frac{1}{32}$" deep slot which is precision milled in the face of disk portion 18 by conventional numerically controlled milling equipment. The outer end 24b of the ribbon terminates in very nearly tangential relationship to the periphery of plastic disk portion 18, and is in electrical contact with a slip ring 46 affixed to disk portion 18 about its periphery. In accordance with the definition of an Archimedean spiral, the radial distance of points along the curve from axis A increases in direct proportion to the angular distance from its origin.

Axis B of hole 40, in which stud 36 is disposed, is aligned along a radial reference line E, FIG. 3, at a position therealong midway between the radial distance F, FIG. 2, to inner end 24a of the ribbon and the radial distance G to outer end 24b. Another conductor strip 48, FIG. 4, is bonded to the outer end of slab 26. Small metallic conductive elements 50 and 52 are disposed over the conductive plastic material of the resistance strip 32 at the opposite ends thereof, and are in essentially flush relationship to the surface of strip 32 therebetween. Element 50 is adjacent to and electrically connected to wing portion 34a of resilient conductor strip 34, and element 52 is adjacent to and electrically connected to conductor strip 48. These conductive elements may be formed by an electroplating process, as is conventional in the conductive plastic art. The inner edge 50a, FIG. 5 of element 50, and inner edge 52a of element 52, are precisely located relative to path of rotation of inner and outer ends, 24a and 24b, respectively, of spiral ribbon 24. Inner edge 50a is so located that the radially innermost portion of the ribbon at end 24a is contiguous to or in a very slight engaging relationship with edge 50a as it sweeps across resistance strip 32. This is shown in FIG. 4, where the relative position of spiral ribbon end 24a is indicated in phantom lines. Inner edge 52a is similarly located where it is contiguous to or slightly engaged by the radially outermost portion of ribbon end 24b in its path of rotation. The linearly extending crest of resistance strip 32 is rounded, with the result that wiping contact between the edge of the ribbon and the surface of the resistance strip is limited to the point of tangency of the ribbon edge and the rounded crest.

As a final step in the manufacture of potentiometer 10, the lock nut 42 is loosened and the angular position of slab 26 so adjusted that the resistance strip 32 contacts both inner end 24a and outer end 24b of the spiral ribbon at only one angular position of pick-off element 16, and the resistance strip and the spiral ribbon are in contact at a single point, only, for all other angular positions. When this position is chosen, lock nut 42 is tightened. Stated another way, the slab 26 is fixed at an angular position of adjustment which defines the sole angular position in which resistance strip 32 contacts both ends of the ribbon with a high degree of angular resolution. It will be apparent that rotation of the resistance strip about axis B midway between its ends permits adjustment to such a single position regardless of deviations of the ends of the ribbon from exact dimensions, and that since the contact is limited to the point of tangency of the ribbon edge and the rounded crest of the resistance strip, the adjustment can be made with great accuracy. Furthermore, since contact of both ends of the ribbon with the resistance strip places a short circuit across the ends of the slab, the conductivity between conductor strips 34 and 48 can be used as a convenient and accurate indicia of the presence of contact by both ends of the ribbon during the adjustment process.

Lead wires 56 and 58, which are connected to conductor strips 34 and 48, terminate at terminal posts 60 and 62, respectively, forming the fixed winding terminals of the potentiometer 10. A terminal post 64 is electrically connected to slip ring 46 by means of a sliding contactor 66 affixed to the inner end of the terminal post. As previously described, slip ring 46 is in contact with spiral ribbon 24 so that terminal post 64 forms the movable contact terminal of the potentiometer.

For a description of the operation of potentiometer 10, reference is now made to FIG. 5, which is a diagrammatic, isometric view of spiral ribbon 24 and slab 26, in which ribbon 24 is in its angular position whereat the resistance strip contacts both outer ends 24a and 24b, and which also shows an electrical schematic of a circuit including a digital voltmeter 72. The terminal post 60 from resilient conductor strip 34 is connected to ground and also to the negative side of a potential source 68 through a limiting resistor 70. Terminal post 62 is connected to the positive side of source 68. Digital voltmeter 72 is of a conventional type provided with a four decimal digit numerical indicator, and having as one of its modes of operation a "ratio meter" mode in which the indicator shows the decimal equivalent of a fraction representing the ratio of a voltage applied to a variable input terminal 74 relative to reference voltage applied to a fixed input terminal 76. The digital voltmeter 72 also has a ground connection terminal 78. It is assumed that voltmeter 72 is switched to operate in the aforesaid "ratio meter" mode of operation. The potential across the potential source 68 and limiting resistor 70, which is the voltage across resistance strip 32 of potentiometer 10, is applied between the fixed input terminal 76 and the ground connection terminal 78 of the voltmeter. The potential at terminal 64, which is the potential picked off by spiral ribbon 24 is applied to variable input terminal 74 of the voltmeter.

At the angular position of ribbon 24, shown in FIG. 5, the ribbon effectively places an electrical short circuit between the metallic conductive elements 50 and 52 at the ends of resistance strip 32, which in turn places potentiometer terminals 62 and 64 at ground level and thereby positively provides an absolute zero reading of the digital voltmeter. A small finite movement of shaft 20 in a clockwise direction moves the outer end 24b of the spiral ribbon out of contact with resistance strip 32, and results in a single point of contact, symbolically indicated by arrow H, between the resistance strip and the spiral ribbon. This new point of contact H is a finite angular distance along spiral ribbon 24 away from its inner end 24a and, since the radius at points along an Archimedean spiral increases in proportion to angular position, the new point is also moved a finite distance in the upward direction along resistance strip 32, as the directions appear in the drawing. As a result, the ribbon member is moved away from the contiguous or slight engaging relationship with metallic conductive element 50, and is instead in contact with the resistance strip a small finite distance away from edge 50a of the element. It is characteristic of "conductive plastic" resistance strips that they exhibit a high degree of resolution of detectable change in resistance between spaced points of contact under slight movements of a contact element. For example, a typical conductive strip has resolution characteristics by which movements of a sliding contact for distances of less than 100 micro inches result in distinguishable differences in resistance. Accordingly, movement of the point of contact to position H results in the appearance of an extremely small, but finite, proportion of the total strip resistance between metallic insert 50 and spiral ribbon 24. This places the spiral ribbon at a potential which is a very small fraction of the potential across the ends of the resistance strip corresponding to the ratio of small finite distance of point H from edge 50a to the total length of the resistance strip 32. For this new position the reading of the digital voltmeter indicator is a very low number which is the decimal equivalent of this fraction in four significant decimal digits. Similarly, a small finite counter-clockwise movement of shaft 20 from the angular position in which both ends of the spiral ribbon contacts the resistance strip, results in movement of inner end 24a out of contact with the resistance strip and movement of the point of contact between the ribbon and the conductor strip to point I, a finite distance below edge 52a. This places the spiral ribbon at a potential which is very slightly less than the total potential across the ends of the resistance strip, resulting in a corresponding reading of the voltmeter which is only slightly less than unity. It will be apparent that in any of the various other possible intermediate angular positions of shaft 20 about axis A, the resistance strip and spiral ribbon will be in engagement at a point along the ribbon which is at a radial distance from axis A proportional to the clockwise angular displacement of the shaft from the angular position in which both ends of the spiral ribbon are in contact with the resistance strip, and the spiral ribbon will be placed at a potential which is the fraction of the total potential across the resistance strip corresponding to ratio of shaft displacement to one full revolution of the shaft.

An important feature of the invention is its special utility in conjunction with a digital voltmeter operated in a ratio meter mode of operation, as described in connection with FIG. 5. Placing a short circuit across the ends of strip 32 at the angular position in which both ends of ribbon 24 are in contact with the resistance strip positively provides an absolute zero reading of the voltmeter indicator and thereby accurately defines a "zero" angular position of the shaft. There is an extremely high degree of angular resolution of the single angular position at which both the inner and outer ends of ribbon 24 contact resistance strip 32, and there is also a high degree of resolution of distinguishable increase of voltage at the pick-off element from a zero voltage condition, and of distinguishable decrease of such voltage from maximum voltage condition. Further, there is essentially no gap between the maximum potential and zero potential conditions under continuous rotation of the shaft through its zero position, it will be apparent that potentiometer 10 is capable of use in conjunction with a digital voltmeter to provide very accurate numerical "read out" of angular positions of shaft 20.

FIG. 6 diagrammatically illustrates a modification of the invention in which a pair of spiral ribbons 24' and 24", which for convenience of illustration are represented by the same line, are commonly ganged to the same shaft and in the same angular position about the shaft axis A'. A pair of resistance strips forming slabs 26' and 26", separately engage ribbons 24' and 24". The slabs are located with their respective axes of adjustment of angular position B' and B" at diametrically opposite location about axis A'. Under rotation of the common shaft the potentials picked off by the ribbon 24' and ribbon 24" will be exactly 180° out of phase with one another, as is desired in some application of potentiometers in control and intrumentation systems.

It will be appreciated that the invention is not limited to the production of a voltage at the ribbon element which varies in direct proportion to the angular displacement of a shaft, but by choice of different predetermined shapes of convolution of ribbon 24, may be used to provide pick off voltages that are other desired functions of shaft displacement.

Obviously many modifications and variations of the present invention are possible in the light of the above teachings. It is therefore to be understood that within the scope of the appended claims the invention may be practiced otherwise than as specifically described.

What is claimed is:
1. A potentiometer comprising;
 (a) rotatable means carrying a contact strip of a conductive material formed as a predetermined angular portion of a predetermined curve of convolution generated about the axis of rotation of the rotatable means, said predetermined angular portion of the curve of convolution being three hundred and sixty degrees (360°) in angular length about the axis of rotation,
 (b) an elongated resistance strip having a straight contact edge, said resistance strip being made of a material exhibiting a resistance between any two spaced points therealong proportional to the distance between said points, and
 (c) means for supporting said resistance strip in approximately radial alignment about the axis of rotation and in sliding engagement with said conductive contact strip, the length of said contact edge of the resistance strip being co-extensive with the path of rotation of the various radii along said curve of convolution, whereby the conductive contact strip places an electrical short circuit across the ends of said contact edge of the resistance strip in the angular position of the rotatable means in which the contact edge engages both the inner and outer ends of the curve of convolution, and the contact edge engages the conductive contact strip at a single point therealong and at a radial distance in accordance with the angular position of the rotatable means at all other angular positions of the rotatable means.

2. Apparatus in accordance with claim 1, wherein
 (d) said curve of convolution is an Archimedean spiral.

3. Apparatus in accordance with claim 1, wherein
 (e) said resistance strip is made of conductive plastic.

4. Apparatus in accordance with claim 1, wherein
(f) said means for supporting said resistance strip includes pivotally adjustable means for adjusting the angular position of the contact edge of the resistance strip about a pivot axis midway between the minimum and maximum radius of said predetermined portion of the curve of convolution, whereby the contact edge may, by a final adjustment in the assembly of the potentiometer, be set to an angular position in which the contact edge engages both the inner and outer ends of the curve of convolution at essentially only one angular position of the rotatable means, irrespective of unauthorized deviation of the angular length of the curve of revolution from said length of three hundred and sixty angular degrees (360°).

5. Apparatus in accordance with claim 4, wherein
(g) the portion of the contact edge of the resistance strip which is in confronting relationship to said conductive contact strip has a generally rounded outwardly convex cross section, whereby engagement between the contact edge and the conductive contact strip is limited to the portion of the contact edge in tangential relationship to the conductive contact strip.

6. Apparatus in accordance with claim 5, wherein
(h) said conductive contact strip is made of metallic ribbon strip carried by the rotatable means with the edge of the ribbon strip material in confronting relationship to the contact edge of the resistance strip.

7. Apparatus in accordance with claim 6, and
(i) said means for supporting the resistance strip includes resilient means for resiliently urging same into contact with the conductive contact strip.

8. Apparatus in accordance with claim 1, and
(j) a pair of conductive means connected to one end and the other of the opposite ends of the contact edge of the resistance strip forming the potentiometer electrical terminal pair for applying a potential across the resistance strip, and
(k) a third conductive means connected to the conductive contact strip forming the potentiometer electrical terminal for delivering an output potential.

9. Apparatus in accordance with claim 8, wherein
(l) said pair of conductive means includes metallic conductive elements adjacent the opposite ends of the contact edge of the resistance strip and at substantially flush relationship to said edge,
(m) said conductive contact strip being adapted to place a short circuit between said conductive elements in said angular position in which the contact edge engages both the inner and outer ends of the curve of convolution.

References Cited by the Examiner

UNITED STATES PATENTS

| | | | |
|---|---|---|---|
| 2,398,758 | 4/1946 | Miller | 338—117 |
| 2,452,664 | 11/1948 | Koenig | 338—91 X |
| 2,918,642 | 12/1959 | Webster et al. | 338—89 |
| 2,992,387 | 7/1961 | Austin | 338—89 X |

References Cited by the Applicant

UNITED STATES PATENTS 2,477,711    8/1949    Youhouse.

ANTHONY BARTIS, *Primary Examiner.*